United States Patent Office 3,298,499
Patented Jan. 17, 1967

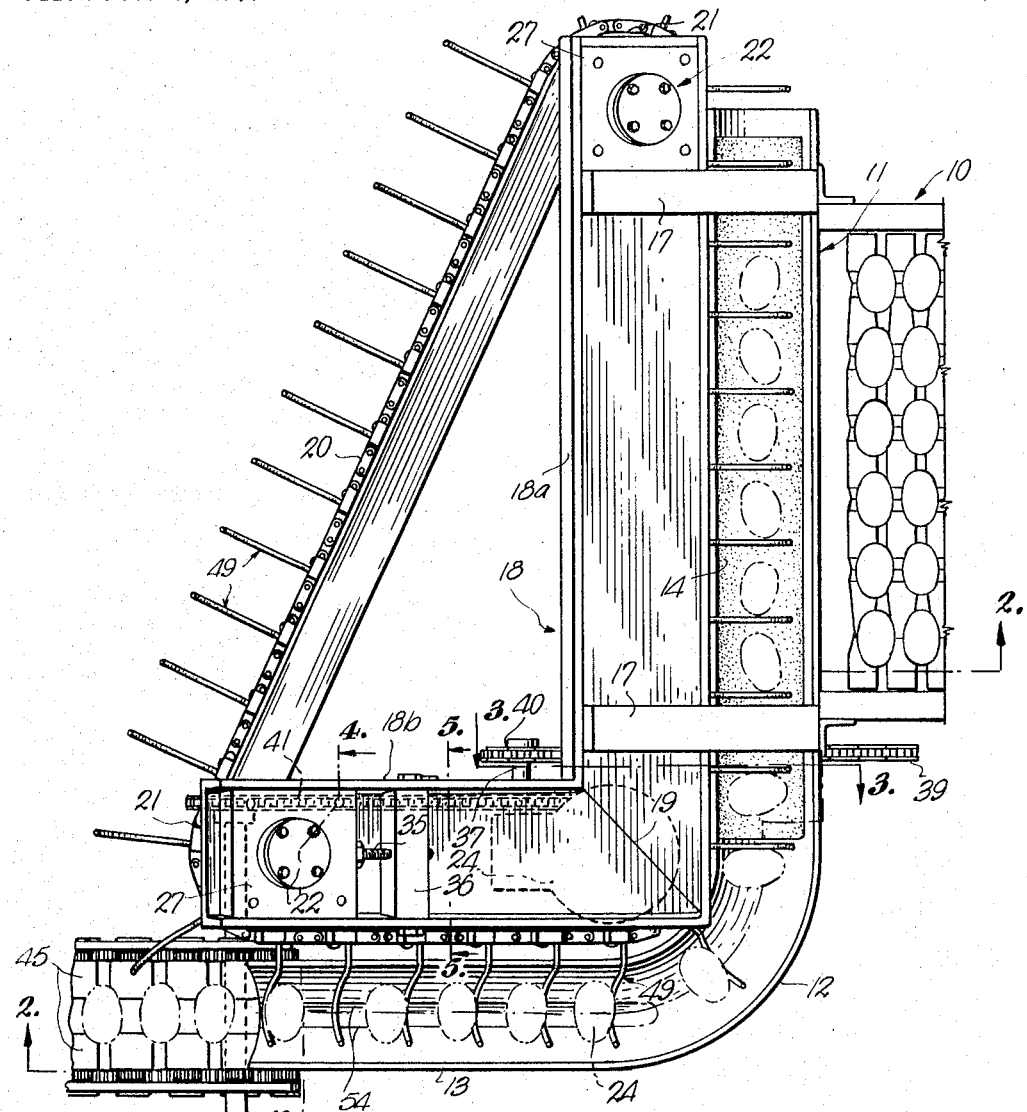

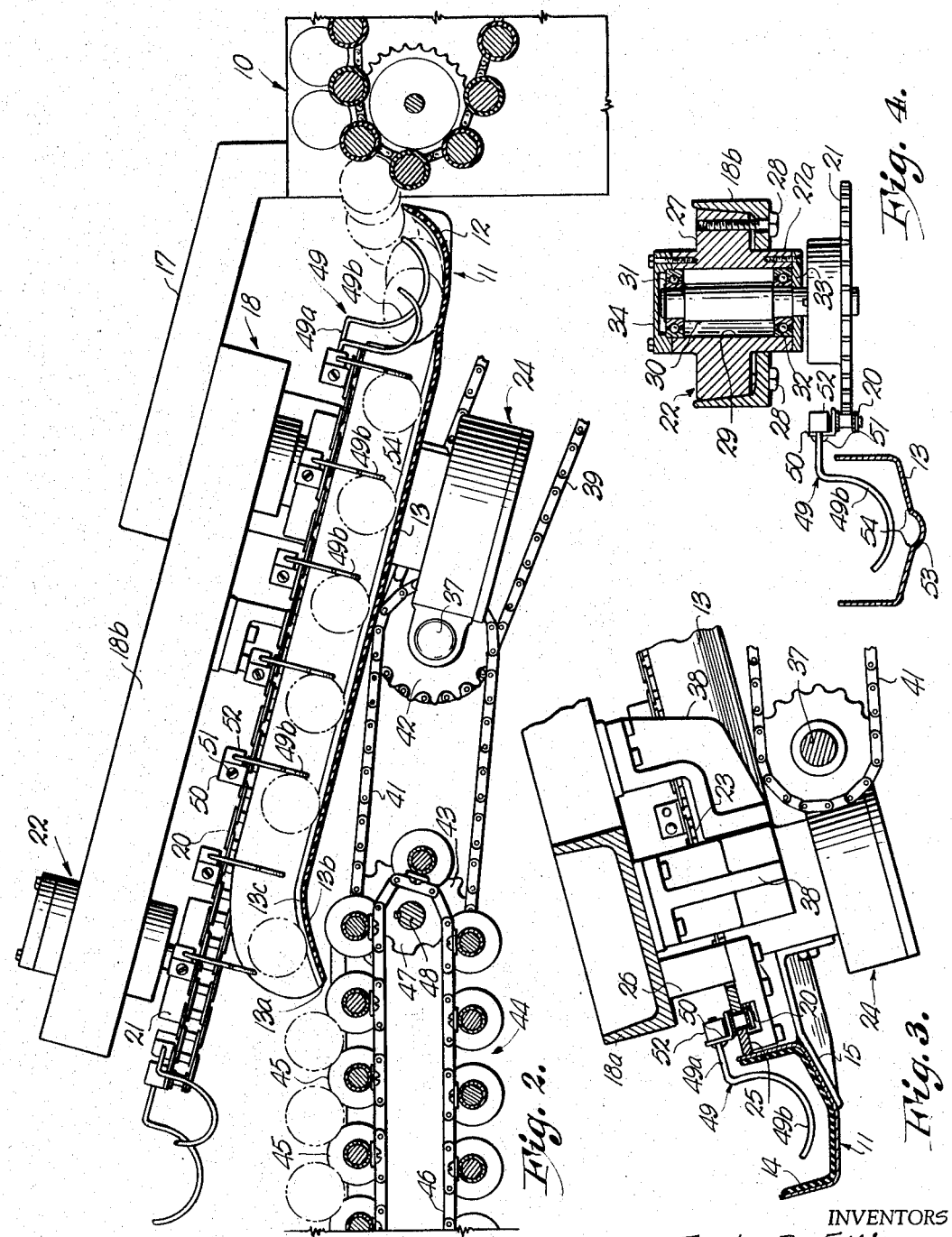

3,298,499
CONVEYING AND TRANSFER APPARATUS FOR EGGS
Earle B. Ellis, Mission, and Carl E. Chesney, Kansas City, Kans., assignors to Standard Brands, Incorporated, New York, N.Y., a corporation of Delaware
Filed Dec. 6, 1965, Ser. No. 511,686
5 Claims. (Cl. 198—102)

This invention lies in the broad field of handling and conveying materials and refers more particularly to apparatus for handling ovoidal or ellipsoidal articles, for example, eggs, and delivering a plurality of such articles in a timed feed sequence to a given pickup zone. In certain aspects the invention is an improvement over the apparatus disclosed in our prior Patent 3,217,857, issued November 16, 1965.

A main object of the invention is to provide apparatus for receiving eggs or like articles from a row feed unit, for example, a candling machine, rearranging the rows of eggs into a continuous single file column and delivering and discharging each egg in accurately timed sequence to a selected discharge point. The apparatus of the invention is characterized by simplicity in construction coupled with a capability of providing a positively controlled discharge along with a desired orientation of the egg at the time of discharge.

Another important object of the invention is to provide apparatus of the character described which lends itself particularly to converting a row feed of eggs moving in a given direction to a single file feed in the same direction with the egg axes generally normal to the direction of advance.

Other and further objects of the invention together with the features of novelty appurtenant thereto will appear in the course of the following description.

In the accompanying drawings, which form a part of the specification and are to be read in conjunction therewith, and in which like reference numerals indicate like parts in the various views;

FIG. 1 is a top plan view of a preferred egg handling apparatus embodying the invention, the view showing portions only of an associated candler discharge conveyor and single file pickup conveyor;

FIG. 2 is a sectional view taken along 2—2 of FIG. 1 in the direction of the arrows;

FIG. 3 is an enlarged sectional view taken along line 3—3 of FIG. 1 in the direction of the arrows;

FIG. 4 is an enlarged sectional view taken along line 4—4 of FIG. 1 in the direction of the arrows; and FIG. 5 is an enlarged sectional view taken along line 5—5 of FIG. 1 in the direction of the arrows.

Referring now to the drawings, reference numeral 10 identifies the terminal end of an egg candling and feeding mechanism which serves to advance eggs E in spaced rows, each row in the illustrated embodiment comprising six eggs. The eggs are advanced by the feeding mechanism toward and discharged into a receiving chute or trough 11 disposed transversely across the path of the advancing rows. The candling and feeding mechanism may be of any available type which operates to deliver rows of eggs to and discharge them at the terminus thereof. For example, Patent 2,961,087, issued November 29, 1960, discloses a typical structure of this type which can be used. Reference to the aforesaid patent can be made for the complete description. For the purposes of this application, it is enough to know that at uniform timed intervals a row of eggs is delivered adjacent and into the trough 11. As will be seen subsequently, each row, once in the trough, is moved out of the way of the following row so that the latter can be received in the trough without damage to the eggs.

The trough 11 provides one leg of an L-shaped trough structure which includes also the right angle bend 12 and the upwardly inclined (FIG. 2) terminal portion or leg 13. As can best be seen in FIG. 3, the trough portion 11 is generally U-shaped in cross section. Preferably it is lined with a softly resilient material 14, for example a flexible urethane foam or sponge latex or rubber, in order to reduce the likelihood of breakage of the eggs as they are deposited in the trough from the candling unit. The trough can be supported in any convenient fashion, as by underlying support brackets 15 (see FIG. 3) forming a shelf for the bottom of the unit and by similar brackets secured to and extending from the end frame portion 10 of the candler.

The shelf brackets 15 are secured to a stationary framework made up of parts which are supported from and adjacent the end portion 10 of the candler by the cantilever arms 17. The basic structural component of this framework is an L-shaped assembly 18 made up of two channel beams 18a and 18b mitered and welded together as at 19. The arms 17 are rigidly secured to and overlie the beam section 18a which is parallel with trough 11.

As can best be seen from FIGS. 2 and 3, the beam assembly 18 is so oriented that the base webs of the beam sections thereof lie in a plane extending upwardly and away from the trough 11. One of the principal functions of the beam assembly is to support a series of three sprockets which drivingly support an endless chain 20 arranged in triangular array. The sprockets 21 at the ends of the respective beam sections 18a, 18b are carried by similar thrust bearings 22 later to be described. The intermediate sprockets 23 (not seen in FIG. 1, but shown in FIG. 3) lies below the juncture 19 of the beam sections 18a, 18b, and is supported by a worm drive assembly 24, also later to be described. The axes of the respective sprockets are parallel with one another and normal to the earlier described plane of the beam webs; the chain 20 is thus in a plane parallel with the beam web plane.

The chain 20 is preferably a roller link chain. The passes or flights of the chain parallel with the trough sections 11 and 13 are guided for straight line travel by rails or tracks 24, 25, which in turn are supported from stationary parts of the frame such as the depending studs 26, seen in FIGS. 3 and 5.

The basic construction of the sprocket support bearings 22 is seen in FIG. 5, which, while a section through the left hand bearing of FIG. 1, can be taken as typical for the one at the upper end of the figure also. Each includes a main body 27 which is secured to the adjoining beam section by bolts 28 which extend through the web of the beam. A boss 27a is on the lower end of the main body, this projecting downwardly through an opening in the web. The body and boss have a bore 29 in which the sprocket shaft 30 is supported by upper and lower thrust bearings 31, 32. Preferably, end plates 33, 34, respectively, retain the thrust bearings in the bore.

In order to provide for adjustment of the tension in the chain 20, one of the bearings is made adjustable longitudinally of the beam section to which it is secured. In the illustrated embodiment, it is the left hand bearing 22, as viewed in FIG. 1, which has the capability of such adjustment. The adjustability is achieved through a thrust screw 35 which is swiveled to the main body of the bearing and threaded through a stationary block 36 bolted to the beam web. Rotation of the screw 35 results in movement of the block. Naturally the bolts 28 which normally secure the main body of the bearing to the web, will be loosened before adjustment and retightened once the new position is reached. The openings in the web which receive the bolts 28 and the boss 27a in the main body are made sufficiently oversize as to permit the necessary movement.

As earlier noted, the sprocket 23 is carried on the output shaft of the gear box 24. This gear box includes a right angle worm drive, the worm being located on a shaft 37. The housing for the worm gear box is supported from the bottom of the beam sections 18a and 18b by the L-shaped support brackets 38, seen in FIG. 3.

The candler 10 is drivingly connected with the rotary input shaft 37 of the gear box 24 through the medium of a chain 39 which is connected with a driving sprocket (not shown) on the candler and is trained around a driven sprocket 40 on the shaft 37. Thus the rate of movement of the chain 20 is correlated with the drive speed of the candler. A second chain 41 is connected with another sprocket 42 on shaft 37 and this leads to a driven sprocket 43 for driving the roller conveyor generally identified at or by reference numeral 44. The details of construction of roller conveyor 44 are disclosed in our aforesaid Patent 3,217,857, and for those points which are not specifically covered hereinafter, reference can be made to that patent. The purpose of the conveyor is to receive the eggs as they leave the discharge end of the trough leg 13 and to continue them onwardly while maintaining them in a crosswise or transverse orientation with respect to the path of advance. As can be seen from the aforesaid patent, the conveyor 44 accomplishes this through the laterally and axially spaced roller elements 45 which serve to support an egg between each set of adjacent pairs thereof. The rollers are carried by spaced chains 46 which are each supported at the egg receiving end by a sprocket 47 mounted on a shaft 48 which also has keyed thereto the earlier described driven sprocket 43.

Turning now to the triangularly arrayed chain 20, mounted thereon at uniform intervals throughout the length of the chain are a plurality of laterally extending pusher fingers or elements 49. As can best be appreciated from FIGS. 2, 3, and 4, each of these elements comprises a short rod-like section 49a projecting straight out on the outer side of the chain, and a U-shaped terminal portion 49b which is located within the curvature of the trough sections 11, 12 and 13, while the pusher elements are being moved therethrough by the chain. Any convenient attaching means can be used to affix the pusher elements to the chain. In the illustrated embodiment, the attachment means comprises an upstanding lug 50 on a chain to which is secured by a screw 51 a head portion 52 formed integral with the inner end of the short rod-like section 49a of the pusher element.

The pusher elements 49 are so spaced on chain 20 that the U-shaped terminal portions 49b thereof are just far enough apart to receive an egg therebetween with the egg axis lengthwise in the trough. It will be noted that this is the manner in which the eggs are delivered from the candler into the trough.

The trough sections 11, 12 and 13 are so constructed relative the chain 20 and associated pusher elements that the portions 49b of the pusher elements are substantially centered in the trough sections, most particularly in the curved transition section 12 and the upwardly inclined section 13. The portions 49b of the pusher elements also lie in planes normal to the bottom of these trough sections. The purpose of this feature will be brought out later.

It will be observed that the bottom of the upwardly inclined trough section 13 is provided with a central longitudinally extending depression 53 defining two spaced shoulders 54 which serve as line contact and support points for an egg as it is advanced therealong. The radius of curvature of the depression 53 is substantially smaller than the average curvature of the center wall portion of an egg so as to insure that the egg will be supported at two points across the bottom with the portion of the egg wall between the shoulders 54 out of contact with the trough or any portion thereof. This arrangement causes the egg to tend to move toward a position in which its center of gravity is in a vertical plane spaced equidistant between the shoulders 54 as the egg is rolled along the trough.

It will be observed that the pusher elements, being substantially centered in the trough and being essentially symmetrical with respect to the longitudinal vertical center plane of the trough, will assist in maintaining the eggs in a true transverse orientation and will cooperate with the shoulders 54 in achieving this orientation.

At the upper or discharge end of trough 13, the trough bottom peaks out and then declines toward the discharge lip 13a over which the eggs individually descend onto the roller conveyor 44. This provides a short downwardly inclined terminal portion 13b for the trough down which the eggs will roll by gravity once they clear the high point 13c of the trough. This lip is so positioned relative to the rollers 45 of the conveyor 44 that as each egg descends over the lip it moves smoothly into a pocket formed by the rollers. The inclination of the descending trough portion 13b is, as earlier noted, below the horizontal and is approximately that which will result in disengagement between a descending egg and the pusher element in front of it and arrival at the discharge lip 13a simultaneously.

For exemplary purposes, we have found that an upward incline of approximately 15° for the major portion of trough 13 and a downward inclination of approximately 5° to 10° for the descending terminal portion 13b will produce the desired results.

In the operation of the invention, the rows of eggs are fed from the candler 10 at uniformly spaced intervals into the trough section 12. The interval between successive rows is that which is required for the six fingers 49 which respectively move against and advance the delivered eggs to displace them from the path of the next row.

As each row is delivered to trough section 12, the fingers 49 in the path of the eggs engage and start them moving longitudinally of the trough. The inertia of the eggs causes them to resist movement by the fingers and thus the eggs are turned generally toward an attitude in which the major axes are transverse to the direction of the advance. The motion is not particularly smooth during initial contact of the fingers with the eggs, but as they move into the transition section and on into the upwardly inclined trough section 13, the motion becomes much more smooth. The orientation of the axes and the maintenance of the eggs in a true transverse crosswise position in the trough is facilitated greatly by the provision of the parallel bottom support shoulders 52 in the upwardly inclined track section supplemented by the manner of engagement of the U-shaped portions 49b of the pusher elements with the egg. Generally, the engagement with the egg is substantially at the largest diameter portion and it is this same portion which tends to be centered between the shoulders 52. The upward incline of the trough section 13 assures that the eggs will tend to bear rearwardly against the pusher elements thereby maintaining firm contact of the pusher elements with the eggs and a smooth advance up the trough.

As the eggs move across the high point 13c of the trough section 13 and into the declining terminal portion 13b, there will be a gravitational acceleration, causing them to separate from and advance down the downwardly inclined terminal portion ahead of the pusher element that has brought them to this point. Ideally, the inclination of the portion 13b would be such as to, unassisted, result in a speed of descent which would coincide the arrival of the egg with the arrival of the central zone of a group of four rollers. To insure, however, that this happens, and to accommodate eggs of differing weights and diameters, the trough 13 and associated pusher elements 49 are so related that any egg moving too rapidly down the trough will be intercepted by and restrained momentarily by the pusher element which is just ahead of it. Thus, the terminal portion of the trough and the preceding pusher element 49 serve as a gate which opens in properly timed relationship with the roller conveyor 44 to permit an egg to drop into position for further advancement by the roller conveyor.

As we have seen earlier, the movement of the pusher elements 20 and displacement of the rollers of conveyor 44 are synchronized by the interconnected driving arrangement provided by the chains 39 and 41. The chain 39 is driven, as we have earlier described, from a take-off sprocket on the candler 10, which is driven at a constant speed. Alternatively, the transfer mechanism of this invention can be powered from a separate motor (not shown) so long as its speed is accommodated to the discharge speed of the candler 10.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In apparatus for feeding egg-shaped articles successively to a receiving zone at timed intervals, the combination of an elongate trough having a discharge end edge adjacent said zone, said trough having upwardly and downwardly portions, respectively, inclined toward said discharge end edge, pusher elements arranged serially along said trough with portions thereof positioned within the trough to engage articles within the trough, carrier means for said pusher elements operable to advance said elements in a defined path along said trough toward and past said discharge end edge, the vertical spacing between the path of said article engaging portions of said pusher elements and the bottom of said trough at said discharge end edge being such that an article descending by gravity along the downwardly inclined trough portion is prevented from passing beyond said end edge until the pusher element immediately in front of it has passed said end edge also.

2. The combination as in claim 1 wherein the bottom of said trough has therein two parallel, laterally spaced shoulders running lengthwise of said trough providing spaced support tracks for said articles.

3. The combination as in claim 1 including conveyor means positioned adjacent said discharge end edge and having serially arranged article receiving members adapted to receive and convey articles away from said discharge end edge as they successively pass thereover, and means synchronizing the movement of said conveyor means with said pusher means.

4. The combination as in claim 1, said carrier means comprising an endless chain, means securing said pusher elements to said chain, and means supporting said chain with one pass thereof parallel with the bottom of the upwardly inclined portion of said trough and with a portion of the chain pass extending beyond the discharge end edge of the trough.

5. The combination as in claim 4, said trough being L-shaped in plan, said discharge end edge at the end of one leg of the L, said chain having adjacent passes parallel with the respective legs of the L.

References Cited by the Examiner
UNITED STATES PATENTS 1,460,491    7/1923    Landohl _____ 198—174
3,217,857    11/1965    Ellis _____ 198—33

EVON C. BLUNK, *Primary Examiner.*

R. E. AEGERTER, *Assistant Examiner.*